(12) United States Patent
Nachum et al.

(10) Patent No.: US 9,992,041 B2
(45) Date of Patent: Jun. 5, 2018

(54) SCALING ADDRESS RESOLUTION FOR MASSIVE DATA CENTERS

(71) Applicant: MARVELL ISRAEL (M.I.S.L) LTD., Yokneam (IL)

(72) Inventors: Youval Nachum, Holon (IL); Ilan Yerushalmi, Hod Hasharon (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 173 days.

(21) Appl. No.: 14/988,149

(22) Filed: Jan. 5, 2016

(65) Prior Publication Data

US 2016/0134435 A1    May 12, 2016

Related U.S. Application Data

(62) Division of application No. 13/717,095, filed on Dec. 17, 2012, now Pat. No. 9,253,141.

(60) Provisional application No. 61/645,440, filed on May 10, 2012, provisional application No. 61/603,854, filed on Feb. 27, 2012, provisional application No. 61/578,604, filed on Dec. 21, 2011, provisional application No. 61/576,741, filed on Dec. 16, 2011.

(51) Int. Cl.
| | |
|---|---|
| *H04L 12/46* | (2006.01) |
| *H04L 29/12* | (2006.01) |
| *G06F 9/455* | (2018.01) |
| *H04L 12/721* | (2013.01) |
| *H04L 12/741* | (2013.01) |

(52) U.S. Cl.
CPC ...... *H04L 12/4675* (2013.01); *G06F 9/45558* (2013.01); *H04L 45/66* (2013.01); *H04L 45/74* (2013.01); *H04L 61/103* (2013.01); *G06F 2009/45595* (2013.01)

(58) Field of Classification Search
CPC ..... H04L 61/103; H04L 45/74; H04L 45/741; H04L 45/745
See application file for complete search history.

(56) References Cited

U.S. PATENT DOCUMENTS

| | | | |
|---|---|---|---|
| 6,657,974 B1 * | 12/2003 | Britton | H04L 29/12009 370/255 |
| 2011/0206047 A1 | 8/2011 | Donthamsetty et al. | |
| 2011/0299537 A1 | 12/2011 | Saraiya et al. | |
| 2012/0008528 A1 * | 1/2012 | Dunbar | H04L 12/462 370/255 |

FOREIGN PATENT DOCUMENTS

EP    1318631 A2    6/2003

* cited by examiner

*Primary Examiner* — Jamal Javaid

(57) ABSTRACT

There is provided a network device disposed at an interface between an access segment and an interconnecting layer of a data center. The network device includes an address cache and an address resolution processor configured to receive an address request addressed to virtual machines in a transmission domain of the network device. The address request requesting a layer 2 address of a target virtual machine in the data center, and specifying a layer 3 address of the target virtual machine. In response to receiving a reply, the network device updates the address cache to include an entry specifying the layer 2 address of an edge device of an access segment which has the target virtual machine having a respective layer 3 address corresponding to the specified layer 3 address.

17 Claims, 7 Drawing Sheets

SCALING ADDRESS RESOLUTION FOR MASSIVE DATA CENTERS

CROSS-REFERENCE TO RELATED APPLICATIONS

This is a divisional application of U.S. application Ser. No. 13/717,095, filed Dec. 17, 2012, which claims priority from the following four prior applications: (1) U.S. Provisional Patent Application No. 61/576,741 filed on Dec. 16, 2011; (2) U.S. Provisional Patent Application No. 61/578,604 filed on Dec. 21, 2011; (3) U.S. Provisional Patent Application No. 61/603,854 filed on Feb. 27, 2012; and (4) U.S. Provisional Patent Application No. 61/645,440 filed on May 10, 2012. The disclosures of all five prior applications are incorporated herein in their entirety by reference.

BACKGROUND

Field

The current disclosure relates to address resolution for networked virtual machines (VMs), including, without limitation, those residing in massive data centers where VMs can migrate from one system to another while needing to maintain their network connections after migrating.

Background

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Massive data centers may concurrently serve hundreds of thousands of VMs. VMs are hosted on interconnected physical devices which may be thought of, more generally, as access segments. Multiple access segments communicate with each other by way of a network or the like which may be understood, more generally, as an interconnection layer. Devices that interface access segments with the interconnection layer may generally be understood to be edge devices. A VM on one access segment may thus send communication messages to another VM on a different access segment. This, however, requires knowledge of the other VM's address.

The complexity of requirements for massive data centers is magnified because of the operational factors involved. Take, for example, the just-mentioned situation where a first VM in a first access segment needs to learn the layer-2 address of a second VM. As one step of establishing communication, the first VM broadcasts an address resolution protocol (ARP) request (or Neighbor Discovery (ND) protocol request). The purpose of the broadcast request message is to request the layer-2 network address of the second VM. As such, when a plurality of access segments exists, such ARP/ND broadcast request messages are communicated via the interconnection layer to multiple access segments, even those to whom the second VM is not a member. The extent to which such broadcast messages are sent to various access segments may be thought of, generally, as a broadcast domain.

In massive data centers networked as described above, one attractive feature is to allow virtual machines to move from one access segment to another, all the while keeping the VM's layer-2 and layer-3 network addresses unchanged after migration. One side effect of this feature, however, is that, for ARP and ND protocols or the like, the layer-2 broadcast domain potentially scales up significantly since a virtual machine may migrate to any access segment interfaced with the interconnection layer.

SUMMARY

One or more embodiments of the disclosure relate to reducing broadcast domains for ARP and ND protocols and the like, while keeping the layer-3 and layer-2 network address of virtual machines unchanged even after they migrate, to network devices configured to permit layer-2 broadcast domain reduction, to network devices located at the edge of access segments, and to reducing the size of a cache which logs layer-3 and layer-2 address correlations.

According to an embodiment, there is provided a network device disposed at an interface between a first access segment and an interconnecting layer of a data center, where the network device includes an address resolution processor configured to receive an address request addressed to virtual machines in a transmission domain, typically a broadcast domain, of the network device, the address request specifying a source layer 2 address, requesting a layer 2 address of a target virtual machine in the data center, and specifying a layer 3 address of the target virtual machine. The network device is further configured to transmit a local message over the first access segment requesting the respective layer 2 address of a virtual machine which has a respective layer 3 address corresponding to the specified layer 3 address; and in response to receiving a local reply to the local message from the virtual machine which has the specified layer 3 address, to transmit a reply message to the specified source layer 2 address, the reply message providing the layer 2 address of the network device and the layer 3 address of the virtual machine which has the specified layer 3 address.

According to an embodiment, there is provided a network device disposed at an interface between a first access segment and an interconnecting layer of a data center. The network device comprises an address resolution processor configured to: receive a local data packet from the first access segment, the local data packet including a specified layer 3 address; selectively transmit an address resolution request in a transmission domain, typically a broadcast domain, of the data center, the address resolution request requesting a layer 2 address corresponding to the specified layer 3 address; receive a response to the address resolution request; and update an address cache, based on the received response, to include an entry specifying the layer 2 address of an edge device of an access segment which has a virtual machine having a respective layer 3 address corresponding to the specified layer 3 address, the entry also specifying said respective layer 3 address.

According to an embodiment, there is provided a network which includes a plurality of access segments joined by an interconnecting layer wherein selected access segments of the plurality of access segments each comprises a first network device, the first network device includes an address resolution processor configured to receive an address request addressed to virtual machines in a transmission domain, typically a broadcast but not necessarily a broadcast domain, of the network, the address request specifying a source layer 2 address, requesting a layer 2 address of a target virtual machine in the network, and specifying a layer 3 address of the target virtual machine.

The address resolution processor of the first network device is further configured to transmit a local message over an access segment requesting the respective layer 2 address of a virtual machine which has a respective layer 3 address corresponding to the specified layer 3 address of the target virtual machine, and in response to receiving a local reply to the local message, transmit a reply message to the specified source layer 2 address, the reply message providing the layer 2 address of the network device and the specified layer 3 address of the target virtual machine.

The network further includes selected access segments which include a second network device which includes an address resolution processor configured to receive a local data packet from a first access segment, the local data packet including a specified layer 3 address of the target virtual machine; selectively transmit an address resolution request in a transmission domain of the network, typically but not necessarily a broadcast domain, the address resolution request: requesting a layer 2 address corresponding to the specified layer 3 address; receive a response to the address resolution request; and update an address cache, based on the received response, to include an entry specifying a layer 2 address of a second access segment which has a virtual machine having a respective layer 3 address corresponding to the specified layer 3 address.

According to an embodiment, there is provided a cache table reduction method executed by a network device disposed at an interface between a first access segment and an interconnection layer. The network device is configured to receive a first address request indicating one source layer 3 address and a specified layer 2 address of a source device. Further, the network device is configured to receive a second address request indicating another source layer 3 address and the same specified layer 2 address of the same source device. The cache table reduction method then comprises the address resolution processor using the cache in response to receiving a subsequent address request to make a determination about whether to transmit a related address request throughout a transmission domain of the network.

Although the embodiments are described in the context of data centers, the principles are also applicable to other suitable systems. For example, in an embodiment, the VMs correspond to mobile user equipment (UE) in a packet processing-based cellular network, wherein the UEs and cells have different layers of addresses, corresponding to layer 2 and layer 3 addresses, and where UEs need to migrate between the different cells.

Further, although the embodiments are described in the contexts of VMs and network devices which broadcast packets and/or ARP/ND request and reply messages, the principles are also applicable to networks that do not support broadcasting. For example, in an embodiment of the present disclosure, VMs and network devices may communicate by sending multicasts to a target group or by using multiple unicast connections.

DRAWINGS

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein and equivalent modifications thereof. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
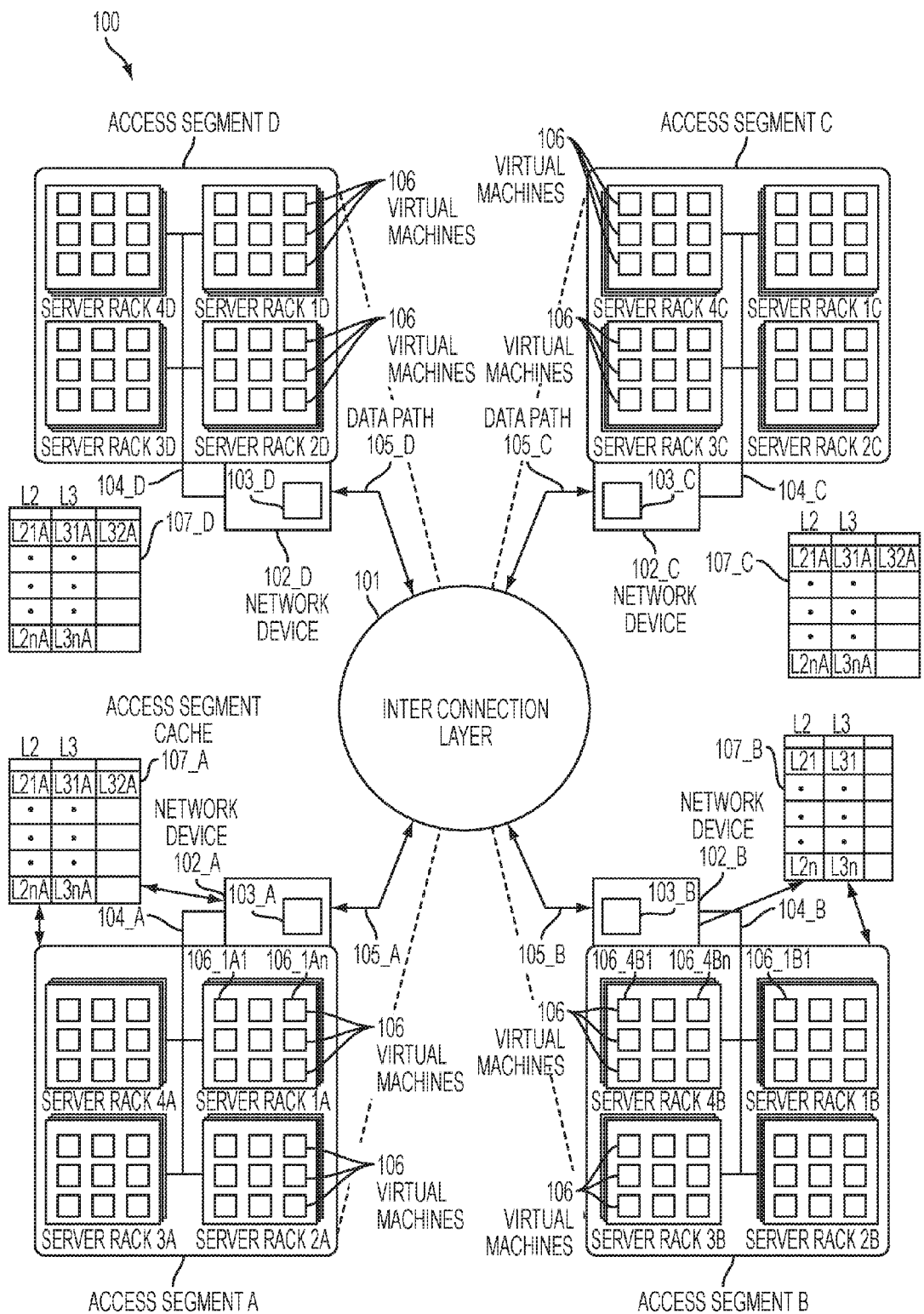
FIG. 1 illustrates a data center with multiple access segments according to an embodiment of the present disclosure.

FIG. 1 shows a network 100 according to an embodiment of the present disclosure. The network 100 includes a plurality of access segments of which only access segments A-D are shown for illustrative purposes (ACCESS SEGMENT A, ACCESS SEGMENT B ACCESS SEGMENT C, and ACCESS SEGMENT D). At the edge of each access segment is located a network device (102_A, 102_B, 102_C, and 102_D, 102 in general) which may be thought of as a type of edge device. The network devices 102 each comprise an address resolution processor (103_A, 103_B, 103_C, and 103_D, 103 in general). Although one network device is shown per access segment, several network devices and other edge devices may be present at the edge of each access segment. Here, network devices 102_B, 102_C, and 102_D may be understood to be "remote" with respect to 102_A without regard to their physical distance, if any, from 102_A.

Access segments A-D are connected to an interconnection layer 101 via their respective network devices (102_A, 102_B, 102_C, and 102_D). Data paths 105_A, 105_B, 105_C, and 105_D connect the respective network devices of access segments A, B, C, and D to the interconnection layer 101. Similarly, data paths 104_A, 104_B, 104_C, and 104_D connect the respective network devices to server racks comprised in each access segment. A data path may be implemented, without limitation, either wirelessly or using physical communication links and it may contain additional devices for ensuring proper communication.

Access segments A-D are shown, for the sake of illustration only, as having physical server racks (SERVER RACK 1A-4A in access segment A, SERVER RACK 1B-4B in access segment B, SERVER RACK 1C-4C in access segment C, SERVER RACK 1D-4D in access segment D). The server racks each house a plurality of virtual machines (VMs) (106 in general). The actual physical implementation with respect to a number of servers or the use of racks at all is not critical to this description. For illustrative purposes, VMs 106 of FIG. 1 are labeled with suffixes that indicate their respective access segments, server racks, and with a numerical identifier. For example, VM 106_4B1 is located in SERVER RACK 4B of access segment B and labeled with a 1 to distinguish it from other VMs in SERVER RACK 4B.

In an embodiment, each access segment A-D has a corresponding cache (107_A, 107_B, 107_C, 107_D, 107 generally) which stores information. The physical embodiment of cache 107_A, for example, may be an internal storage medium (not shown) of network 102_A or it may be distributed across internal storage media of a plurality of devices (including network device 102_A) associated with access segment A, or it may be implemented using any other suitable mechanism for storage. The same considerations apply to cache 107_B, 107_C, and 107_D.

The function of the caches, in an embodiment, shall be described now with respect to cache 107_A. However the same considerations apply to cache 107_B, 107_C, and 107_D.

Each entry in cache 107_A comprises a specific layer 2 address, for instance a MAC address, and one or more layer 3 network addresses, for instance an IP address, associated with the specific layer 2 address. A cache entry is set, according to an example embodiment, to expire after a predetermined time elapses from the time when the entry was stored in the cache.

According to an embodiment of the present disclosure, the specific layer 2 address stored in the cache 107_A for a given VM is that of a network device and not that of the VM. For example, cache 107_A may comprise an entry that lists the layer 3 address of VM 106_4B1 in association with the layer 2 address of network device 102_B.

Further, for example, cache 107_A may comprise an entry that lists the layer 3 address of VM 106_4B1, the layer 3 address of VM 106_4B2, the layer 3 address of VM 106_4B3, . . . , and the layer 3 address of VM 106_4Bn where n is an integer, in association with the layer 2 address of network device 102_B. Cache 107_A may also comprise an entry that lists the layer 3 address of VM 106_1C1, the layer 3 address of VM 106_1C2, the layer 3 address of VM 106_1C3, . . . , and the layer 3 address of VM 106_1Cn where n is an integer, in association with the layer 2 address of network device 102_C. According to an example embodiment, therefore, the caches 107 store layer 3 addresses of remote VMs 106 in association with the layer 2 address of their respective network device 102.

Compared with a conventional approach of storing layer 3 addresses of remote VMs 106 in association with the layer 2 addresses of those same remote VMs 106, the cache 107 stores a significantly smaller and more scalable list by storing multiple remote VM 106 layer 3 addresses in association with only a single remote network device 102 layer 2 address. As such, network devices 102, according to the present disclosure, achieve scaled address resolution suitable for massive data centers (SARMD), for example. A network device 102, according to the present disclosure, serves as a scaled ARP (SARP) proxy and can also function as an ARP cache of VMs 106 located in remote access segments, in an embodiment. By doing so, network devices 102 also enable a reduction in the volume of ARP/ND address request messages broadcast over the interconnection layer, as described further below.

Figure 2:
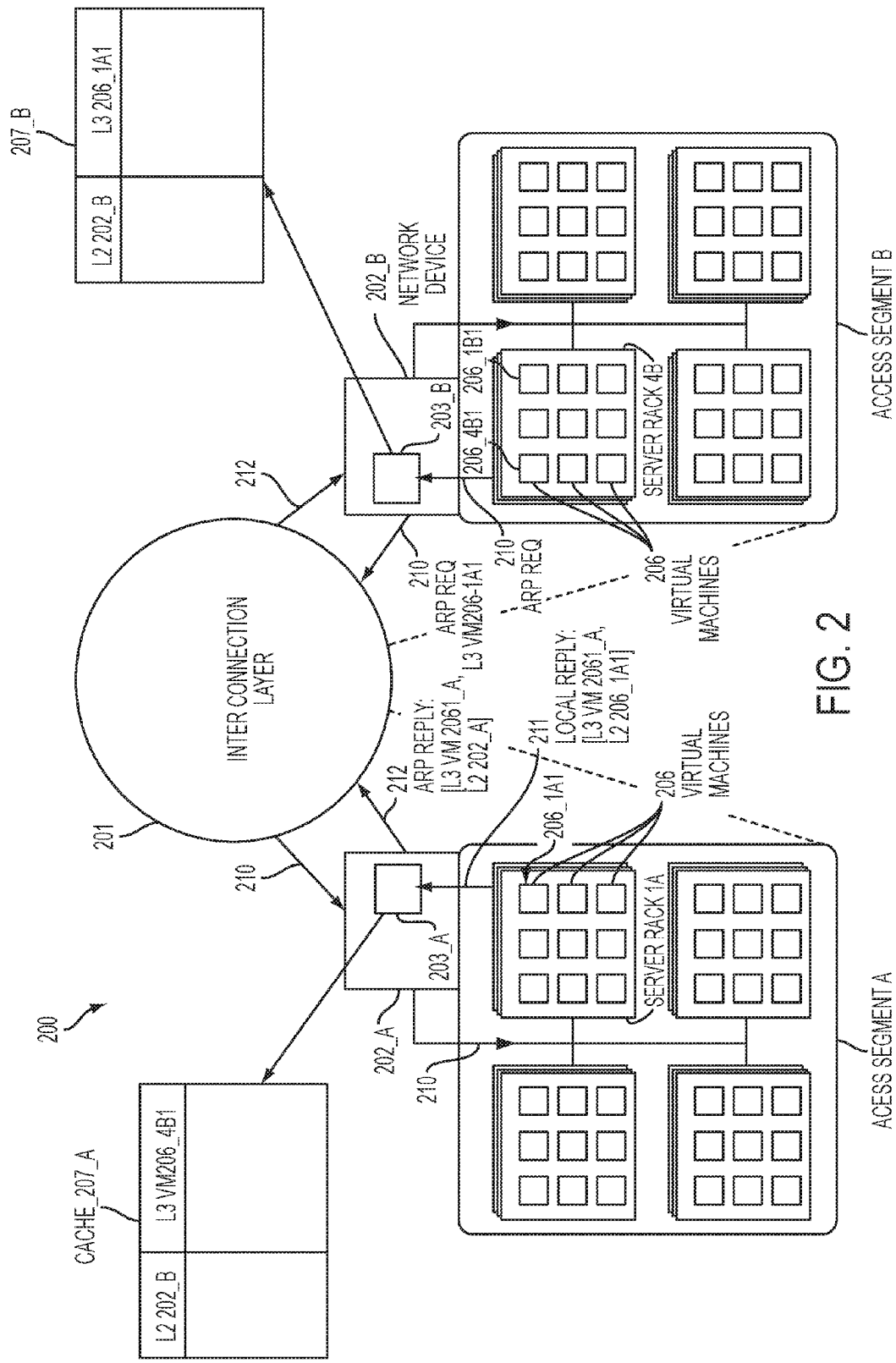
FIG. 2 illustrates a network device at the edge of an access segment which receives an address request message, according to an embodiment of the present disclosure.

FIG. 2 shows an embodiment of the present disclosure in which all VMs 206 share the same layer 2 transmission domain, which in the example is a broadcast domain.

In a first example, a first VM on one access segment requests address information about a second VM on the same access segment. The first VM already knows the layer-3 address of the second VM, but needs to know the layer-2 address of the second VM. In this example, the first VM is VM 206_4B1, and the second VM is VM 206_1B1. Both VM 206_4B1 and VM 206_1B1 are on the same ACCESS SEGMENT_B.

VM 206_4B1 transmits an ARP/ND request as described by the ARP/ND protocols. That is, when VM 206_4B1 sends an address request message such as an ARP request, it prepares and sends a message, e.g., which includes a number of information items. More specifically, the address request message indicates the layer 2 address of the sender VM 206_4B1 (i.e., the source layer 2 address); the layer 3 address of the sender (i.e., the source layer 3 address); the layer 3 address of the desired receiver VM 206_1B1 (i.e., the destination layer 3 address); and some indication that the message requests the layer 2 address of the desired receiver (i.e., a request for the destination layer 2 address). The response to such a request is expected to enable VM 206_4B1 to learn the layer 2 to layer 3 mapping of VM 206_1B1.

In this situation, the address request message is a broadcast received by network device 202-B and also by VM 206_1B1, in an embodiment. Since VM 206_1B1 has received the address request message, it responds to VM 206_4B1 with a reply message which includes VM 206_1B1's layer 3 and layer 2 addresses.

In a second example, a first VM on one access segment requests address information about a second VM on a different access segment. As before, the first VM already knows the layer 3 address of the second VM, but needs to know the layer 2 address of the second VM. In this example, the first VM (the requesting VM) is VM 206_4B1 on ACCESS SEGMENT_B, and the second VM (the target VM) is VM 206_1A1 on ACCESS SEGMENT_A. However, when VM 206_4B1 transmits an ARP/ND request 210 for VM 206_1A1, the ARP/ND request 210 is not answered by any VM on ACCESS SEGMENT_B. The request is thus propagated via network device 202_B to all the other access segments of the data center, for example by broadcast, multicast or any other suitable mode of transmission.

Network device 202_A receives the ARP/ND request 210 through the interconnection layer from network device 202_B. Network device 202_A then forwards the ARP/ND request to VM 206_1A1 which in turn responds by transmitting to network device 202_A a local ARP/ND reply 211 indicating its own layer 3 (L3_VM 206_1A1) and layer 2 (L2_VM_206_1A1) addresses. According to the present example, however, address resolution processor 203_A of network device 202_A swaps the layer 2 address of VM 206_1A1 appearing in reply message 211 with the layer 2 address of network device 202_A (L2_202_A, which is its own layer 2 address) and transmits reply message 212, which is the modified version of message 211, back to network device 202_B. In other words, network device 202-A is configured to prepare and send a reply message 212 to the VM which originated the ARP/ND request 210. As noted, the reply message 212 sent by network device 202-A thus includes the layer 3 address of the target VM of the ARP/ND request along with layer 2 address of the network device situated at the edge of the segment in which the target VM resides.

Upon receiving the reply message 212, in an embodiment, network device 202_B caches in cache 207_B the layer 2 address of network device 202_A (L2_202_A) in association with the layer 3 address of VM 206_1A1 (L3_VM 206_1A1). Then, the ARP/ND reply message 212 is provided to VM 206_4B1. In the meantime, network device 202_A also caches in cache 207_A information about the layer 2 address of network device 202_B (L2_202_B) in association with the layer 3 address of VM 206_4B1.

It is noted that while the embodiments described in FIG. 1 describes utilizing a cache, the present disclosure also enables systems wherein a cache is not used. Such systems function as described above, with the difference that there is no saving and updating newly learned layer 2 and layer 3 address correlations.

Figure 3:
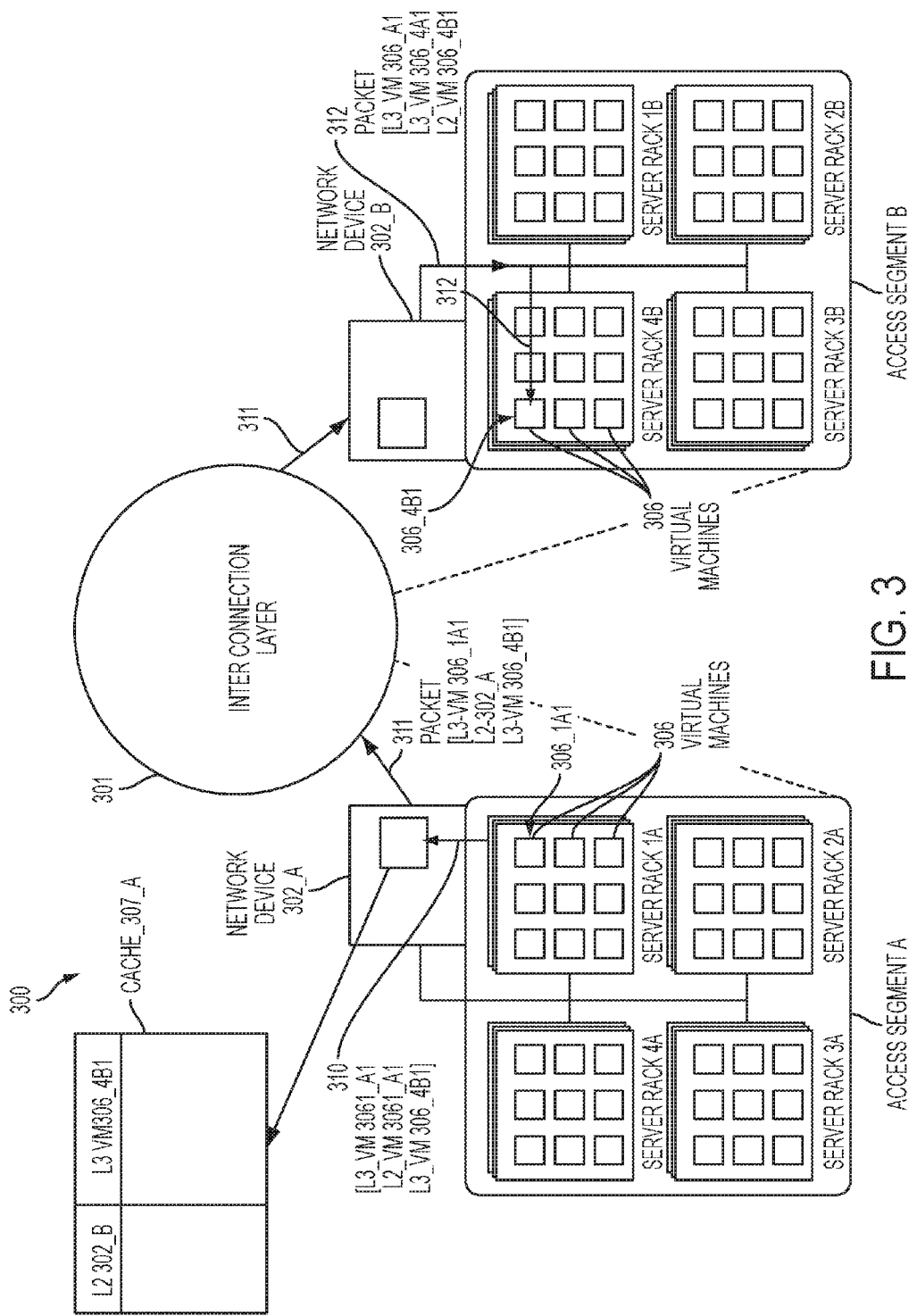
FIG. 3 illustrates a network device at the edge of an access segment which selectively broadcasts an address request, according to an embodiment of the present disclosure.

Whereas FIG. 2 relates to an embodiment in which, for example, an address request message is fulfilled and a cache is structured, FIG. 3 relates to subsequent data transmission operations once the cache 207 has been structured with the layer 2 address of a remote network device in association with the layer 3 address of a remote VM.

In the example embodiment shown in FIG. 3, when a source VM 306 and a destination VM 306 are located in the same access segment, they communicate from source to destination in such a manner that packets are transmitted from (layer 2, layer 3) addresses of the source VM 106 to the (layer 2, layer 3) addresses of the destination VM 306.

However, when a source VM 306 and a destination VM 306 are located in different access segments, the transmitted data packets are transformed. In particular, the data packets go through the network device of the access segment in which the source VM 306 is located and they will also go through the network device of the access segment where the destination VM 306 is located, with the cache 307 being employed, in an embodiment. For example, when VM 306_1A1 (which has previously carried out the address request/reply procedure depicted in FIG. 2) transmits a packet 310 to a VM 306 located in access segment B, for example VM 306_4B1, the packet is sent via network device 302_A. Packet 310 includes the layer 3 address of VM 306_1A1 (L3_VM 306_1A1), the layer 2 address of VM 306_1A1 (L3_VM 306_1A1) and the layer 3 address of destination VM 306_4B1 (L3_VM_306_4B1). Upon receiving packet 310, however, network device 302_A modifies packet 310's source layer 2 address which it changes to be its own layer 2 address and keeps the destination address unchanged, according to the information found in cache 307, to produce modified packet 311. The network device 302_A then forwards packet 311 to network device 302_B. In this example embodiment, it is assumed that ARP/ND requests originating from VM 306_4B1 were previously received by network device 302_A and consequently that the layer 3 address of network device 302_B was cached in cache 307_A in association with the layer 3 address of VM 306_4B1, in an embodiment where caching is used.

Packet 311 includes as source addresses, the layer 3 address of source VM 306_1A1 (L3_VM 306_1A1), the layer 2 address of network device A (L2_302_A), while for destination addresses, the layer 3 address of the destination VM 306_4B1 (L3_VM_306_4B1) and the layer 2 address of network device 302_B.

When network device 302_B receives packet 311 it modifies the destination layer 2 address (L2_302_B) to be the layer 2 address of VM 306_4B1 (L2_VM_306_4B1) based on the packet's destination layer 3 address (L3_VM_306_4B1).

Figure 4:
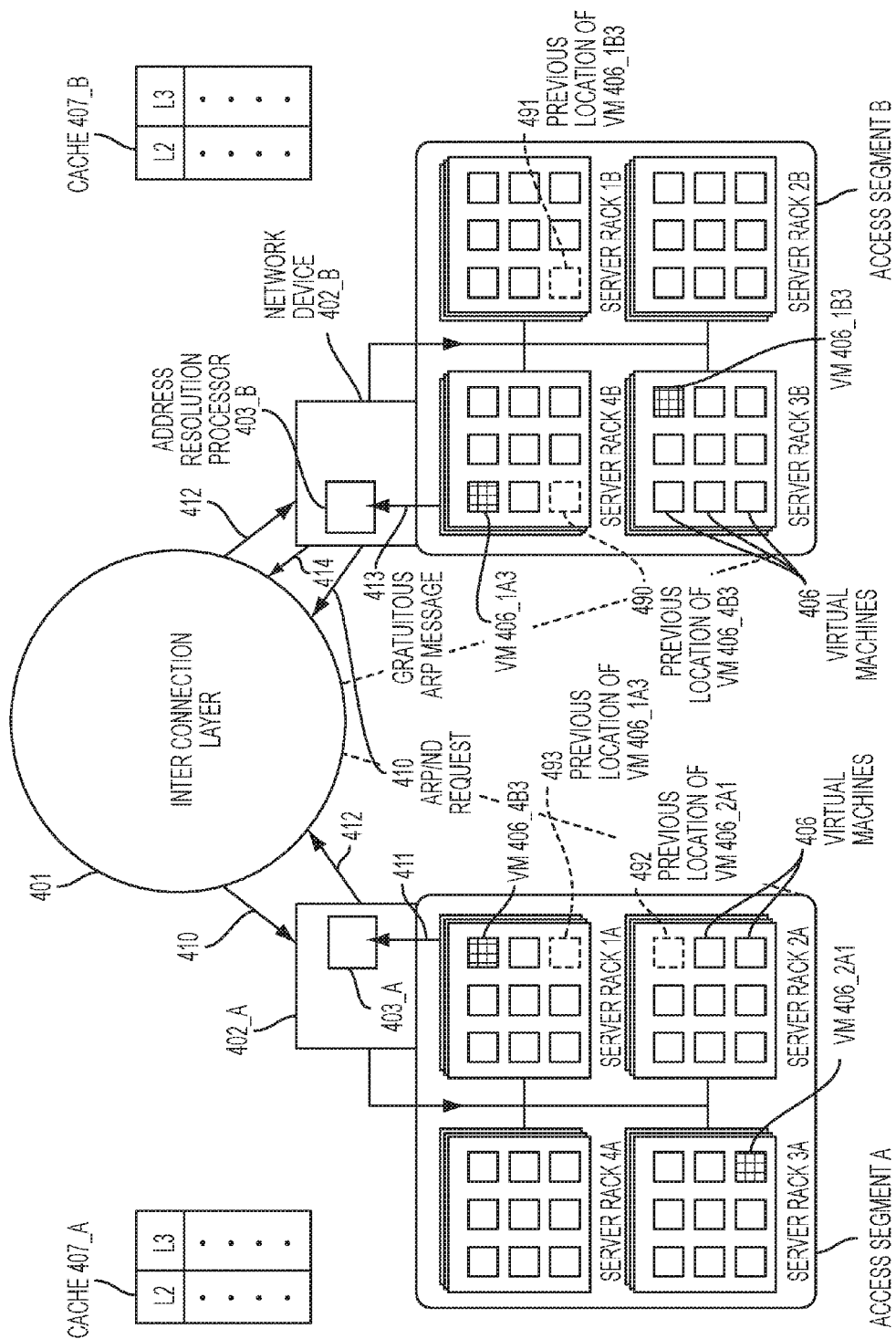
FIG. 4 shows network devices at the edge of an access segment configured to locate virtual machines that have migrated.

Turning now to FIG. 4, there is shown another example embodiment of the present disclosure in which virtual machines migrate from one access segment to a remote access segment or virtual machines migrate from one location of an access segment to another location of that same access segment.

According to the present example, when a VM 406 migrates locally within an access segment, the layer 3 to layer 2 mapping of that VM 406 remains the same because the layer 2 address and the layer 3 address of that VM 406 remain unchanged after migration. Thus, for VMs 406 located in the same access segment as the migrated VM 406, address resolution for the migrated VM 406 is performed using ARP/ND.

For example, if one source VM 406, located in ACCESS SEGMENT_B, issues an ARP/ND request for VM 406_1B3 which has migrated to SERVER RACK 3B from previous location (491) of SERVER RACK 1B, the one source VM 406 will be provided with an ARP reply message by VM 406_1B3 comprising the layer 2 address of VM 406_1B3. Similarly, if a another source VM 406, located in ACCESS SEGMENT_A, issues an ARP/ND request for VM 406_2A1 which has migrated to SERVER RACK 3A from previous location (493) of SERVER RACK 1A, the another source VM 406 will be provided with an ARP reply message by VM 406_2A1 comprising the layer 2 address of VM 406_2A1.

The SARP protocol is used, in an embodiment, when source VMs 406 located in a first access segment issue ARP/ND requests or transmit packets to a target VM 406 located in a second access segment, where the target VM 406 has migrated from one location of the second access segment to another location in the second access segment. This is because the specific layer 3 address of the target VM 406 is still structured in the caches 407 in association with the layer 2 address of the network device of the second access segment. In other words, the SARP protocol is transparent to local migrations of virtual machines.

When for example, VM 406_4B3 migrates from ACCESS SEGMENT B to ACCESS SEGMENT A, address resolution is carried out as described below, in an embodiment.

When a source VM 406 located in ACCESS SEGMENT B broadcasts, for instance, an ARP/ND request for VM 406_4B3, no ARP/ND reply will be generated locally since VM 406_4B3 has moved to ACCESS SEGMENT A. As such, network device 402_B will transmit an ARP/ND request (410) across its transmit domain, typically a broadcast or multicast domain. ARP/ND request 410 comprises the layer 3 address of VM 406_4B3 and the layer 2 address of network device 402_B.

Once VM 406_4B3 receives ARP/ND request through network device 402_A, VM 406_4B3 forwards a local reply 411 to network device 402_A which modifies local reply message 411 and transmits reply message 412 to network device 402_B. The reply 412 comprises the layer 3 address of VM 406_4B3 and the layer 2 address of network device 402_A.

As shown in the previous embodiments, network device 402_B updates cache 407_B with the layer 2 address of network device 402_A in association with the layer 3 address of VM 406_4B3. Subsequent packet transmissions to VM 406_4B3 from source VMs 406 in ACCESS SEGMENT B are forwarded directly to network device 402_A based on the newly cached information. As such, the SARP protocol allows seamless migration of virtual machines across access segments of massive data centers.

ARP/ND mapping is updated by aging (i.e. entries in the cache expire) or by the sending of a "gratuitous ARP/ND"

request message, for example. A, in various embodiments. A gratuitous ARP/ND request message is a message sent by the VM or by a VM manager function of an actual system hosting the VM in order to force new entries in caches that store ARP/ND layer 3 to layer 2 mappings to update after the VM has migrated. The gratuitous ARP request may be understood, more generally, to be an address request message which is broadcasted, or multicasted, not for the sake of establishing communication with a particular remote VM, but for the sake of prompting an update of caches 407. Alternatively, entries are simply aged out from cache 407 after a predetermined time, with the result being that network devices 402 behave as if no layer 2 to layer 3 address mapping exists for a VM.

In an embodiment of the present disclosure, an outbound gratuitous ARP/ND message 413 of a VM 406_1A3 that has migrated from location (493) of ACCESS SEGMENT A to ACCESS SEGMENT B is modified by the SARP proxy protocol implemented by network device 402_B, as explained already previously with respect to FIGS. 1-3, upon network 402_B receiving the gratuitous ARP message 413. Further, network device 402_A, upon receiving the modified gratuitous ARP message 414 updates cache 407_A to include the layer 2 address of network device 402_B in association with the layer 3 address of VM 406_1A3.

Figure 5A:
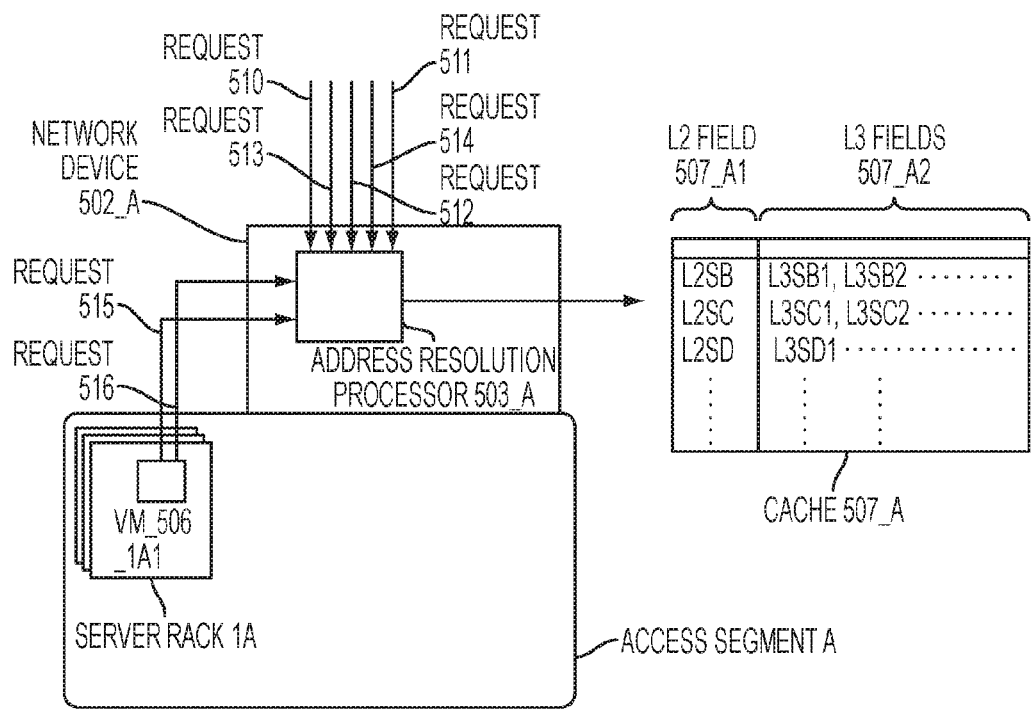
FIG. 5A shows a method for generating reduced sized cache tables according to an embodiment of the present disclosure.

FIG. 5A shows an example embodiment in which an address resolution processor 503 is configured to receive a plurality of ARP/ND request messages (510-516). ARP/ND request messages are received from other network devices through the inter-connection layer (101, 201, 301, 401). ARP/ND request 514 and 516 are received from local VM 506_1A1. Although FIG. 5A shows the messages being received in parallel, such is not necessarily the case; address resolution processor may be configured to receive request messages in parallel and/or in sequence.

In an embodiment, upon receiving ARP/ND request messages 510-514, address resolution processor 503 updates cache 507 to include an entry correlating the source layer 2 addresses specified in the request messages with their respective source layer 3 addresses. The size of the cache is potentially reduced because, in this embodiment, the layer 3 addresses of VMs located in one access segment are saved in association with a single layer 2 entry, i.e. that of the network device of the one access segment.

For example, upon receiving ARP/ND request messages 510 and 511, the address resolution processor 503 caches in cache 507_A, L3SB1 and L3SB2 (which are the layer 3 addresses of the originating VMs) in association with a single entry L2SB since both ARP/ND request messages 510 and 511 originate from VMs in the same access segment. In this example, L2SB is the layer 2 address of the network device where the originating VMs are located. Similarly, upon receipt of ARP/ND request messages 512 and 513 L3SC1 and L3SC2 are cached by the address resolution processor 503 with a single entry of L2SC. For ARP/ND request message 514, L3SD is cached by address resolution processor with L2SD (the layer 2 address of a network device of an access segment where the VM with address layer 3 address L3SD is located).

Figure 5B:
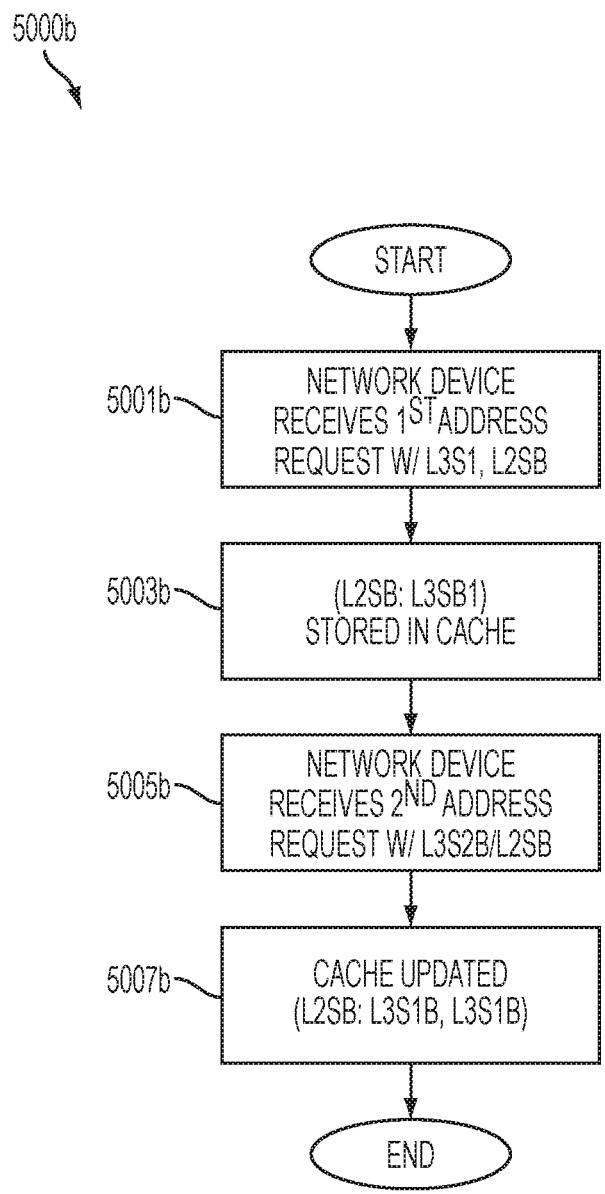
FIG. 5B shows a method for updating SARP cache tables, according to an embodiment of the present disclosure.
Figure 5C:
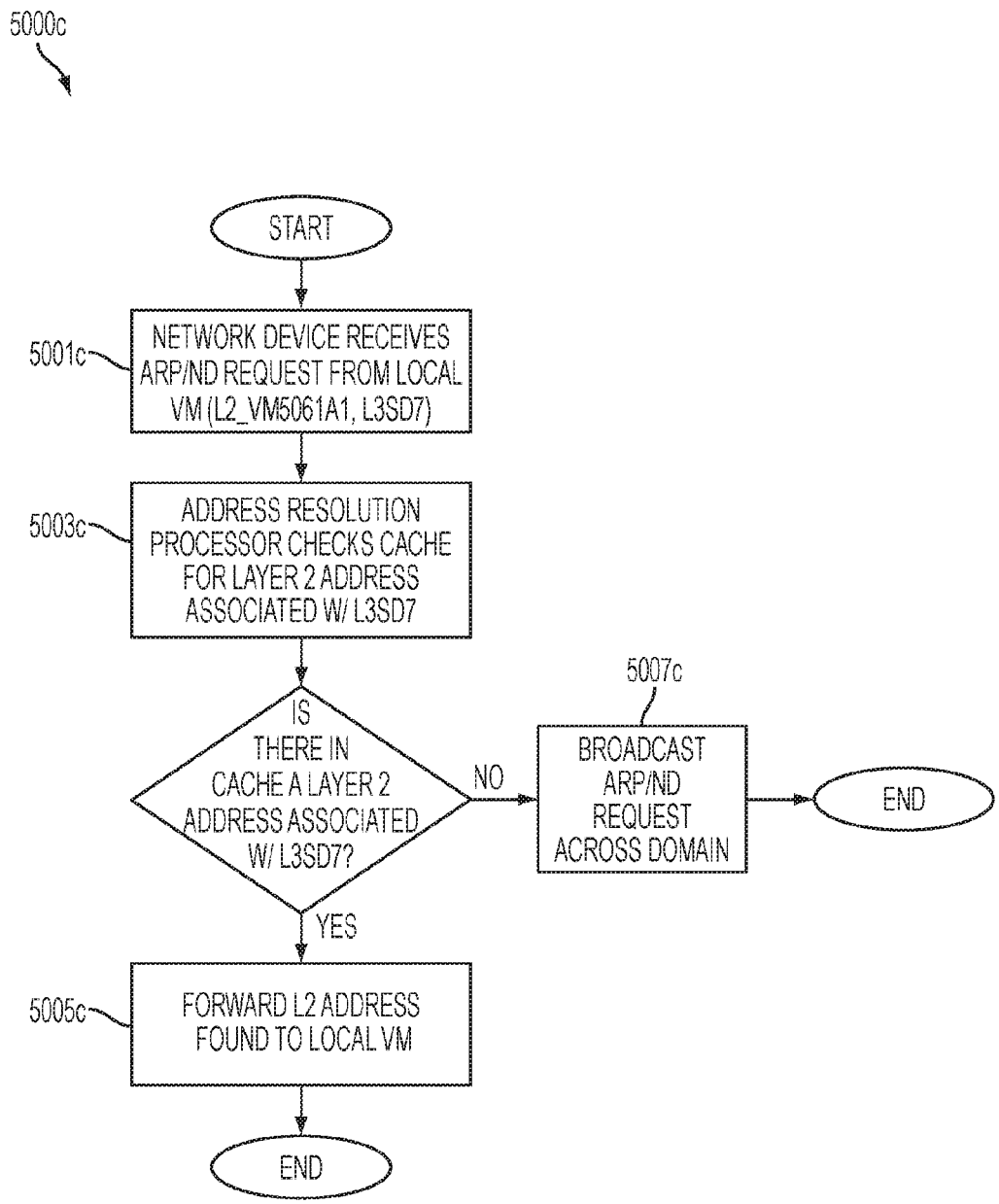
FIG. 5C shows a method for using SARP cache tables to locate virtual machines, according to another embodiment of the present disclosure.

In another embodiment, address resolution processor 503 is configured to receive ARP/ND request messages from local VMs. For example, VM 506_1A1 in ACCESS SEGMENT A issues ARP/ND request messages 515 and 516 to request the layer 2 addresses of remote VMs having layer 3 address L3SD7 and of a remote VM having layer 3 address L3SC1. FIGS. 5B and 5C show methods 5000b and 5000c, according to the present disclosure and according to embodiments described in FIG. 5A, for address resolution in massive data centers using SARP-configured network devices.

In method 5000b (FIG. 5B), the network device is configured to receive (operation 5001b) a first address request indicating one source layer 3 address (L3SB1) and a specified layer 2 address (L2SB). The specified layer 2 address L2SB is stored in association with layer 3 address L3SB1 in 5003b. The network device further receives (5005b) a second address request indicating another source layer 3 address (L3SB2) and the same specified layer 2 address (L2SB). The network device identifies that the new source layer 3 address L3SB2 pertains to the same layer 2 address L2SB (operation not shown). Therefore, the address resolution processor 503 of the network device 502_A (FIG. 5A) updates cache 507 in operation 5007 so that the one and the another source layer 3 addresses (LS31 and LS32) are stored in association with only a single instance of the specified layer 2 address (LS2).

In method 5000c (FIG. 5C), the network device 502_A is configured to receive (operation 5001c) an address request indicating a source layer 2 address of the requesting VM (L2_VM_506_1A1 in FIG. 5A) and a specified layer 3 address (L3SD7) which is the layer 3 address of a destination VM. Address resolution processor 503 (FIG. 5A) checks (5003c) whether there is a specified destination layer 2 address in cache 507 that is associated with specified layer 3 address L3SD7. If such a specified destination layer 2 address is found in association with layer 3 address L3SD7, network device 502_A forwards the specified destination layer 2 address to VM_506_A1 (5005c), if not network device 502_A broadcasts an ARP/ND request across its broadcast domain (5007c).

Although the inventive concept has been described above with respect to the various embodiments, it is noted that there can be a variety of permutations and modifications of the described features by those who are familiar with this field, without departing from the technical ideas and scope of the features, which shall be defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of access segments of data centers, one should not interpret that such specific order and/or arrangements are limited, or that all the operations performed and the components disclosed are needed to obtain a desired result. There are numerous hardware and software devices that can be configured to forward packets, transmit various address resolution messages, update address caches and packet addresses in the manner described in the present disclosure with respect to various embodiments. Accordingly, other implementations are within the scope of the following claims.

The invention claimed is:

1. A network device disposed at an interface between a first access segment and an interconnecting layer of a data center, the network device comprising:
   an address cache, and
   an address resolution processor configured to:
      receive a local data packet from the first access segment, the local data packet including a specified layer 3 address;

selectively broadcast an address resolution request, in a broadcast domain of the data center, the address resolution request requesting a layer 2 address corresponding to the specified layer 3 address;

receive a response to the address resolution request; and update the address cache, based on the received response, the updated address cache to include an address cache entry specifying the layer 2 address of an edge device of an access segment in which a virtual machine having a respective layer 3 address corresponding to the specified layer 3 address is presently disposed, the virtual machine capable of being selectably migrated among network devices within the data center.

2. The network device as set forth in claim 1, wherein: the address resolution processor is further configured:

to make a determination as to whether the address cache includes an entry corresponding to the specified layer 3 address; and to broadcast the address resolution request when the determination is not affirmative.

3. The network device as set forth in claim 1, wherein:

the entry specifying the access segment, in the address cache, is a layer 2 address of a particular network device of the access segment which has the virtual machine having the respective layer 3 address corresponding to the specified layer 3 address; and the network device is configured to use the entry for transmitting subsequent data packets to virtual machines located in the access segment specified by the layer 2 address of the particular network device.

4. The network device as set forth in claim 1, wherein:

the local data packet further specifies a particular layer 2 address of a first virtual machine sending the local data packet; and the network device is configured to construct the address resolution request from the local data packet.

5. The network device as set forth in claim 1, wherein:

in a subsequent transmission of data packets from a first virtual machine in the first access segment to a virtual machine in a second access segment, the network device is configured to replace a particular layer 2 address of the first virtual machine with a layer 2 address of the network using information in the address cache.

6. An address resolution method executed by a network device disposed at an interface between a first access segment and an interconnecting layer of a data center, the address resolution method comprising:

receiving a local data packet from the first access segment, the local data packet including a specified layer 3 address;

in response to the received local packet, selectively broadcasting an address resolution request in a broadcast domain of the data center, the address resolution request:

requesting a layer 2 address corresponding to the specified layer 3 address;

receiving a response to the address resolution request; and updating an address cache, based on the received response, the updated address cache to include an address cache entry specifying the layer 2 address of an edge device of an access segment in which a virtual machine having a respective layer 3 address corresponding to the specified layer 3 address is presently disposed, the virtual machine capable of being migrated among network devices within the data center.

7. The address resolution method as set forth in claim 6, further comprising:

determining whether the cache includes an entry corresponding to the specified layer 3 address; and broadcasting the address resolution requests when the determination is not affirmative.

8. The address resolution method as set forth in claim 6, wherein:

the entry specifying the access segment is a layer 2 address of a particular network device of the access segment which has the virtual machine having the respective layer 3 address corresponding to the specified layer 3 address; and using the entry for transmitting subsequent data packets to virtual machines located in the access segment specified by the layer 2 address of the particular network device.

9. The address resolution method as set forth in claim 6, further comprising:

constructing the address resolution request from the local data packet, the local data packet further specifying a particular layer 2 address of a first virtual machine sending the local data packet.

10. The address resolution method as set forth in claim 6, further comprising:

in a subsequent transmission of data packets from a first virtual machine in the first access segment to a virtual machine in a second access segment, replacing a particular layer 2 address of a first virtual machine with a layer 2 address of the network using information in the address cache.

11. A system in a network including a plurality of access segments joined by an interconnecting layer, the system comprising:

a first network device of a first access segment, among the plurality of access segments, comprising a first address resolution processor configured to:

broadcast an address resolution request in a broadcast domain of the network, the address resolution request requesting a layer 2 address corresponding to a specified layer 3 address included in a local data packet;

a second network device of a second access segment, among the plurality of access segments, comprising a second address resolution processor configured to:

receive the address resolution request; and transmit a response to the address resolution request, the response including information on the second access segment in which a virtual machine having a respective layer 3 address corresponding to the specified layer 3 address is presently disposed, the virtual machine capable of being selectably migrated among access segments; and wherein the first address resolution processor is further configured to update an address cache, based on the response, to include an address cache entry specifying the layer 2 address of an edge device of the second access segment in which the virtual machine is presently disposed as corresponding to the specified layer 3 address of the virtual machine, the virtual machine capable of being selectably migrated among network devices in the network.

12. The system of claim 11, wherein:
the first address resolution processor is further configured to determine whether the cache includes an entry corresponding to the specified layer 3 address; and
broadcast the address resolution requests when the determination is not affirmative.

13. The system of claim 11, wherein:
the entry specifying the access segment is a layer 2 address of a particular network device of the access segment which has the virtual machine having the respective layer 3 address corresponding to the specified layer 3 address; and
the first network device is further configured to use the entry for transmitting subsequent data packets to virtual machines located in the second access segment specified by the layer 2 address of the second network device.

14. The system of claim 11, wherein:
the local data packet further specifies a particular layer 2 address of a first virtual machine sending the local data packet; and
the first network device is configured to construct the address resolution request from the local data packet.

15. The system of claim 11, wherein:
in a subsequent transmission of data packets from a first virtual machine in the first access segment to a second virtual machine in the second access segment, the first network device is configured to replace a particular layer 2 address of the first virtual machine with a layer 2 address of the network using information in the address cache.

16. The network device as set forth in claim 1, wherein the entry also specifying said respective layer 3 address of the virtual machine.

17. The address resolution method as set forth in claim 6, wherein the entry also specifying said respective layer 3 address of the virtual machine.

* * * * *